United States Patent
Jiang et al.

(10) Patent No.: US 12,039,695 B1
(45) Date of Patent: Jul. 16, 2024

(54) SPLIT MACHINE-LEARNING ASSISTED GRAPHICS RENDERING PIPELINE

(71) Applicant: META PLATFORMS TECHNOLOGIES, LLC, Menlo Park, CA (US)

(72) Inventors: Haomiao Jiang, Cupertino, CA (US); Todd Douglas Keeler, Magrath (CA); Grant Kaijuin Yang, San Bruno, CA (US); Rohit Rao Padebettu, San Mateo, CA (US); Steven Paul Lansel, East Palo Alto, CA (US); Behnam Bastani, Palo Alto, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 343 days.

(21) Appl. No.: 17/666,332

(22) Filed: Feb. 7, 2022

Related U.S. Application Data

(60) Provisional application No. 63/215,354, filed on Jun. 25, 2021.

(51) Int. Cl.
  *G06T 5/00* (2024.01)
  *G06T 3/4046* (2024.01)
  (Continued)

(52) U.S. Cl.
  CPC .......... *G06T 3/4046* (2013.01); *G06T 3/4053* (2013.01); *G06T 15/005* (2013.01); *G06T 2200/24* (2013.01)

(58) Field of Classification Search
  CPC ...... H04N 1/40068; H04N 1/409; G06N 3/08; H04S 7/303; H04L 65/80; H04L 65/604; G06Q 30/0643; G06Q 20/20; G06V 10/82
  See application file for complete search history.

(56) References Cited

U.S. PATENT DOCUMENTS

| | | | |
|---|---|---|---|
| 11,706,546 B2 * | 7/2023 | Chan | G06V 40/161 |
| | | | 348/222.1 |
| 11,748,850 B2 * | 9/2023 | Chou | G06N 3/045 |
| | | | 382/254 |

OTHER PUBLICATIONS

Chen C., et al., "Learning to See in the Dark," In Proceedings of the IEEE Conference on Computer Vision and Pattern Recognition, May 4, 2018, 10 pages.
"Deep Learning Super-Sampling," Nvidia, 2019, 4 pages, Retrieved from the Internet: URL: https://www.nvidia.com/en-us/geforce/technologies/dlss/.

(Continued)

*Primary Examiner* — Phuoc H Doan
(74) *Attorney, Agent, or Firm* — Morgan, Lewis & Bockius LLP

(57) ABSTRACT

In particular embodiments, the disclosure provides a method comprising: rendering, on a graphics processing unit (GPU), a low-resolution image associated with a scene, the low-resolution image having a resolution that is lower than a target resolution; transmitting a version of the low-resolution image to a neural accelerator; processing, on the neural accelerator, the version of the low-resolution image using a trained machine-learning model, thereby outputting a plurality of control parameters; transmitting the control parameters from the neural accelerator to the GPU; processing, on the GPU, the low-resolution image and the control parameters to construct a high-resolution image having the target resolution, wherein the GPU is programmed to determine a plurality of pixel weights for performing an interpolation using the control parameters; and outputting the high-resolution image.

20 Claims, 6 Drawing Sheets

(51) Int. Cl.
  *G06T 3/4053* (2024.01)
  *G06T 15/00* (2011.01)

(56) References Cited

OTHER PUBLICATIONS

Dong C., et al., "Learning a Deep Convolutional Network for Image Super-Resolution," In European Conference on Computer Vision, Springer, Cham, 2014, pp. 184-199.

Elsken T., et al., "Neural Architecture Search: A Survey." Journal of Machine Learning Research, Mar. 2019, vol. 20, pp. 1-21.

Gatys L.A., et al., "Image Style Transfer Using Convolutional Neural Networks," Proceedings of the IEEE conference on Computer Vision and Pattern Recognition, 2016, pp. 2414-2423.

Gharbi M., et al., "Deep Bilateral Learning for Real-Time Image Enhancement," Association for Computing Machinery Transactions on Graphics (TOG), Jul. 2017, vol. 36 (4), pp. 118:1-118:12.

Gharbi M., et al., "Deep Joint Demosaicking and Denoising," Association for Computing Machinery Transactions on Graphics (TOG), Nov. 2016, vol. 35 (6), Article 191, pp. 191:1-191:12.

Heide F., et al., "FlexISP: A Flexible Camera Image Processing Framework," Association for Computing Machinery Transactions on Graphics, Nov. 2014, vol. 33 (6), Article 231, pp. 231:1-231:13.

Jiang H., et al., "Architecture of Integrated Machine Learning in Low Latency Mobile VR Graphics Pipeline," SIGGRAPH Asia 2019 Technical Briefs, 2019, pp. 41-44.

Jiang H., et al., "Learning the Image Processing Pipeline," IEEE Transactions on Image Processing, May 30, 2016, vol. 26 (10), 10 pages.

Kim J.W., et al., "Accurate Image Super-Resolution Using Very Deep Convolutional Networks," In Proceedings of the IEEE Conference on Computer Vision and Pattern Recognition, 2016, pp. 1646-1654.

Romano Y., et al., "RAISR: Rapid and Accurate Image Super Resolution," IEEE Transactions on Computational Imaging, 2016, vol. 3, No. 1, pp. 110-125.

Shi W., et al., "Real-Time Single Image and Video Superresolution Using an Efficient Sub-Pixel Convolutional Neural Network," In Proceedings of the IEEE Conference on Computer Vision and Pattern Recognition, 2016, pp. 1874-1883.

Westheimer G., "Visual Acuity," Annual Review of Psychology, 1965, vol. 16, pp. 359-380.

Wronski B., et al., "Handheld Multi-Frame Super-Resolution," ACM Transactions on Graphics (TOG), Jul. 12, 2019, vol. 38 (4), pp. 1-18.

Zhang K., et al., "AIM 2020 Challenge on Efficient Super-Resolution: Methods and Results." European Conference on Computer Vision, Springer, Cham, 2020, pp. 1-36.

\* cited by examiner

SPLIT MACHINE-LEARNING ASSISTED GRAPHICS RENDERING PIPELINE

PRIORITY

This application claims the benefit under 35 U.S.C. § 119(e) of U.S. Provisional Patent Application No. 63/215,354 filed 25 Jun. 2021, which is incorporated herein by reference.

TECHNICAL FIELD

This disclosure generally relates to a novel rendering pipeline for computer graphics.

BACKGROUND

State of the art VR and AR systems may only be able to achieve 20 to 30 pixels per degree (ppd) with the large field of view (FoV) typically required in VR and AR contexts, which is far below the baseline visual standard deemed acceptable for a desktop monitor. As display resolution scales up, this represents a great challenge on traditional graphics-display pipeline designs because of limitations in compute resources, network resources, memory, display bandwidth, and latency budget.

SUMMARY OF PARTICULAR EMBODIMENTS

The embodiments disclosed herein are only examples, and the scope of this disclosure is not limited to them. Particular embodiments may include all, some, or none of the components, elements, functions, operations, or steps of the embodiments disclosed above. Embodiments according to the invention are in particular disclosed in the attached claims directed to a method, a storage medium, a system and a computer program product, wherein any element mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the elements thereof are disclosed and can be claimed regardless of the dependencies chosen in the attached claims. The subject-matter which can be claimed comprises not only the combinations of elements as set out in the attached claims but also any other combination of elements in the claims, wherein each element mentioned in the claims can be combined with any other element or combination of other elements in the claims. Furthermore, any of the embodiments and elements thereof described or depicted herein can be claimed in a separate claim and/or in any combination with any embodiment or element described or depicted herein or with any of the elements of the attached claims.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In one embodiment, the disclosure provides a novel graphics processing pipeline which may be used in a mobile VR or a mobile AR context. Mobile, as used in this context, refers to a situation where a device does not need to be plugged into a power source or otherwise tethered and can be carried by a user. In one embodiment, the disclosure provides a framework for executing machine learning algorithms efficiently in the mobile graphics pipeline. One embodiment may be directed to graphics super-resolution to boost image quality for use in VR or AR applications. In one embodiment, a novel and efficient pipeline design may use neural processors, which may also be referred to as neural accelerators, to help improve rendering fidelity in the mobile graphics pipelines. In one embodiment, various machine learning components, such as one or more neural accelerators, may be integrated as independent modules in the graphics pipeline, alongside additional components such as a graphics processing unit (GPU) and/or a display processing unit (DPU).

In one embodiment, the disclosure provides a first computer-implemented or programmed method for processing images for display on one or more device displays of an electronic device. This processing method may be programmed to start with rendering, on a graphics processing unit (GPU), a low-resolution image associated with a scene, the low-resolution image having a resolution that is lower than a target resolution. The scene can comprise any desired output image, including, as an example, a composite image having multiple layers, which is intended for display to a user of the electronic device. The low-resolution image may need to be displayed at a higher resolution to meet specific visual requirements, necessitating super-resolution. For example only, if the low-resolution image is (M)×(N) pixels, then a high-resolution image can be generated which is (2M)×(2N) pixels.

In one embodiment, the first computer-implemented method may be programmed to transmit a version of the low-resolution image to a neural accelerator. In one embodiment, the low-resolution image may comprise a color image. In one embodiment, the low-resolution image can be processed on the GPU to generate a monochrome (one-channel) version of the low-resolution image. For example, a truecolor RGB image stored in HSL format or HSV format can be converted to greyscale by eliminating hue and saturation information associated with the pixels of the RGB image, while retaining luminance information. In one embodiment, the RGB image can be stored in an M×N×3 matrix. In one embodiment, the RGB image can be converted to HSL or HSB format and then a greyscale image can be stored in an M×N matrix. The M×N matrix may reflect only the luminance information, but not the hue or saturation information. Thus, in particular embodiments, the original version of the low-resolution image may be transmitted to the neural accelerator, while in other embodiments a monochrome or other version of the low-resolution image may be transmitted to the neural accelerator.

In one embodiment, the first computer-implemented method may be programmed to process, on the neural accelerator, the transmitted version of the low-resolution image using a trained machine learning neural model, thereby outputting a plurality of control parameters. In one embodiment, the trained machine learning neural model can be programmed as a convolutional neural network (CNN). As explained further herein with more specificity, the control parameters can be used to generate a high-resolution image from the original low-resolution image. In particular embodiments, each of the pixels of the high-resolution image may be respectively associated with one or more of the control parameters. For example, each of the 2M×2N pixels of the high-resolution image may be associated with one or two control parameters that are specifically tailored to that pixel. In this disclosure, the term "control parameters" may also be referred to as a "guide map," and these terms should be understood to be synonymous.

In one embodiment, the control parameters are used for determining, for each pixel of the high-resolution image, one or more pixel weights respectively associated with one or more specific pixels of the low-resolution image that are used for computing a value for that pixel of the high-resolution image. In particular embodiments, these weights may indicate which pixels of the low-resolution image should be referenced to assign values to a particular pixel of the high-resolution image, and what weight the information of each of those referenced pixels should be given. In one embodiment, the control parameters or guide map can be used to generate a set of convolution kernels that indicate the pixel weights.

In one embodiment, the weights collectively indicate a respective orientation of one or more edges detected by the trained machine learning neural model in the version of the low-resolution image. Thus, in one embodiment, using the monochrome version of the low-resolution image to generate control parameters may be substantially as effective as using the original color version of the low-resolution image to generate control parameters. And much less information needs to be transferred from the GPU to the neural accelerator when sending the monochrome version, thereby saving on power budget and processing resources, and reducing latency.

In one embodiment, the first computer-implemented method may be programmed to transmit the control parameters from the neural accelerator to the GPU. In one embodiment, the first computer-implemented method may be programmed to process, on the GPU, the low-resolution image and the control parameters to construct a high-resolution image having the target resolution, wherein the GPU is programmed to determine a plurality of pixel weights for performing an interpolation using the control parameters. For example, the high-resolution image can be constructed by assigning, based on the weights indicated by the guide map, one or more values to each pixel of the plurality of pixels of the high-resolution image.

In one embodiment, the first computer-implemented method may be programmed to output the high-resolution image. In one embodiment, the first computer-implemented method may be programmed to process, on the GPU, the high-resolution image and additional data associated with the scene, thereby outputting a composite image. The additional data may be, for example, additional layers associated with the scene.

In one embodiment, the first computer-implemented method may be programmed to display the composite image on a device display. In one embodiment, final pixel generation and reconstructions can be merged with post-processing steps, e.g. composition or asynchronous time warp, to avoid extra resource cost or latency in the pipeline.

Thus, in one embodiment, the disclosure teaches a split architecture that can separate a graphics pipeline into "smart" and "pixel-heavy" parts for processing by separate but integrated components. The "smart" parts are those tasks that can be efficiently accomplished using machine learning models which may be executed on dedicated hardware accelerators. The "pixel-heavy" parts are those tasks that can be efficiently accomplished using a GPU, which tends to be superior for executing a multitude of simple operations in parallel. In one embodiment, the disclosed architecture therefore leverages the strengths of both a GPU and a neural accelerator while minimizing an amount of data transfer between the two units. In one embodiment, a reduced model output buffer size may reduce overall system latency and power consumption. In one embodiment, the disclosure provides a method for machine learning models to operate on lower resolution buffers, which may improve network throughput and efficiencies, thereby improving the functioning of one or more computing devices.

DESCRIPTION OF EXAMPLE EMBODIMENTS

Figure 2A:
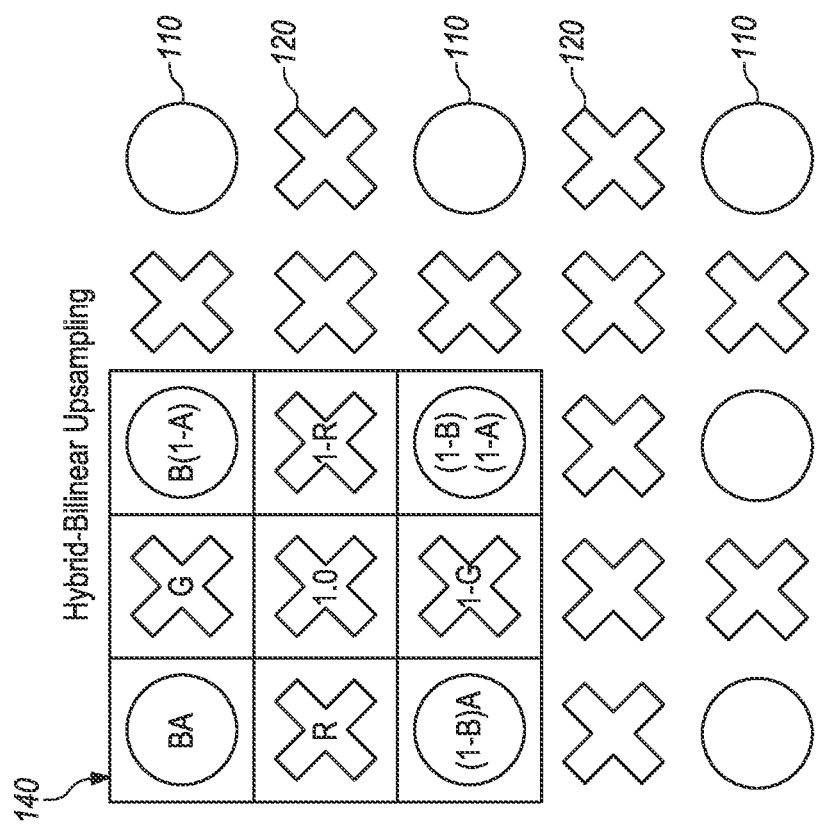
FIG. 2A illustrates a first improved upsampling technique using a convolution kernel and control parameters.

In particular embodiments, this disclosure provides a split machine learning framework to execute machine learning algorithms efficiently in the mobile graphics pipeline. One use case is in graphics super-resolution to boost image quality in virtual reality.

Advances in the virtual reality (VR) graphics display pipelines are required to achieve high visual acuity, as well as to expand the scope of applications and immersive experiences. With the large field of view requirement in VR systems, state-of-the-art systems can only achieve 20 to 30 pixels per degree(ppd), which is far below the desktop monitors and retina visual requirement. As display resolution scales up, it creates a great challenge on the traditional graphics-display pipeline designs because of the limited computer resources, limited network, memory and display bandwidth and limited latency budget. To address this challenge, the disclosure provides a novel efficient pipeline design that leverages machine learning on neural processors to help improve rendering fidelity in mobile graphics pipelines. The present disclosure addresses the bottleneck for executing machine learning in the mobile graphics pipeline with respect to model architectures, neural accelerator mapping, memory bandwidth, power reduction, and pipelining with other components using a split machine learning mobile rendering pipeline.

In a VR graphics pipeline, an application may render frames for both eyes with predicted head/eye tracking data at present/display time for each eye at variable framerate. The rendered frames can be submitted to a system service for further composition and display-optics corrections. The system service can start a few milliseconds before every VSync signal and warp last rendered images to compensate for lens distortion and chromatic aberration. The service can also adjust images to best predict the content at display presentation time with methods including space/time warp and late latching. Because the service is also performed on GPU, it can preempt tile-based app rendering and access GPU resources with higher priority.

The submission procession on modern SoC may not require physical movement of the underlying data in memory. On mobile SoCs, the dynamic random access memory (DRAM) can be shared and accessible from various processors, including a central processing unit (CPU), a graphics processing unit (GPU), a digital signal processor (DSP), a neural processing unit (NPU), a display processing unit (DPU), or other components. This makes it possible to access the same memory block across different processes and even processors without copying on modern high-level operating systems (HLOS). While traditional processing, e.g. CPU and GPU slightly improves from generation to generation, the compute power increase of neural network accelerators has been much faster.

In particular embodiments, the disclosure integrates machine learning components as independent modules in the graphics pipeline. The rendered contents can be mapped to be accessible on the neural accelerator on mobile platforms and the neural network processed pixels can be mapped back to graphics buffers for final compositing. Though memory mapping eliminates copy overhead, the process has high demands on cache/SRAM to DRAM access in the back-and-forth communications for high pixel throughput applications. The high field of view for VR applications may require much higher resolution to achieve similar visual acuity as traditional mobile use cases. Thus, the high throughput cross-processor DRAM sharing presents a technical challenge in VR to enable a machine learning assisted rendering pipeline.

In particular embodiments, the disclosure addresses this technical challenge with a split architecture that separates the tasks into smart and pixel-heavy parts. In this architecture, machine learning can be executed at input resolution to generate intermediate low-resolution guide maps for the GPU to complete the last step of pixel generation. For image processing tasks that assume locality, this architecture can excel by utilizing the strengths of both GPU and neural accelerators. The reduced model output buffer size may reduce the overall system latency and power consumption. In addition, this setup can involve the machine learning models operating on lower resolution buffers which may improve the network throughput and efficiencies. The final pixel generation and reconstructions can be merged with post-processing steps, e.g. composition or asynchronous time warp in the graphics pipeline to avoid extra cost or latency in the pipeline. The hybrid architecture of embodiments can improve (1) memory throughput, (2) the model definition space, and (3) neural accelerator utilization compared to state-of-the-art approaches.

First, with zero-copy memory sharing on mobile architecture, the cost to pass memory across processors may be largely reduced. However, the overhead may not be fully eliminated due to format conversion, alignment, and padding. For efficient internal processing, the GPU typically uses a swizzled format, while the neural accelerator can require a special format other than NHWC or NCHW. The format conversion cost can be significant in VR applications when total frame time is only 11 ms at 90 frames per second. The conversion cost typically scales with the pixel throughput. Thus, we can reduce the memory reformatting cost and sharing overhead through splitting the large amount of pixel workloads. In many applications, another implicit overhead can come from memory paging or spilling from SRAM to DRAM. The SRAM cache on the neural accelerator is usually only a few megabytes due to its high cost. Taking 2× super-resolution from 512×512 to 1024×1024 as an example, operating in a high-resolution domain can easily exceed the SRAM limit and requires paging back and forth to DRAM, even without considering the requirements from caching skip connection activations, etc. The DRAM fetching can stall the model execution and make the model execution a few times slower. To alleviate the problem, intermediate guide map generation and load balancing high resolution simple processing in GPU is desired and can be properly combined with other techniques including tiling and blending.

Second, in mobile SoCs, the efficient pixel generation operations can be better supported on GPU than neural accelerators. For example, pixel shuffle and warping operations may not be supported on certain platforms, limiting the model design space for models in super-resolution or frame reprojection or extrapolation. Using alternative operators (e.g. nearest neighbor upsampling) can require a larger model to achieve the same visual performance. Thus, splitting these GPU efficient operations from the model can enhance flexibility in model definitions.

Third, modern mobile neural accelerators may use large vector sizes to achieve high performance on networks with large channel size (and small spatial resolution). However, with the low latency requirement in mobile VR graphics, the model usually requires large spatial resolution and small channels. This results in a low accelerator utilization ratio. In particular embodiments, the split framework allows using more channels at lower spatial resolution to improve throughput and accelerator utilization ratio and achieve similar effects as tiling or stereo packing in channels. Thus, embodiments of the disclosed technology provide fundamental technical advantages over state-of-the-art standalone pipelines for mobile VR graphics applications with high throughput and locality, and they can be put to use in a variety of contexts.

Upsampling

Figure 1:
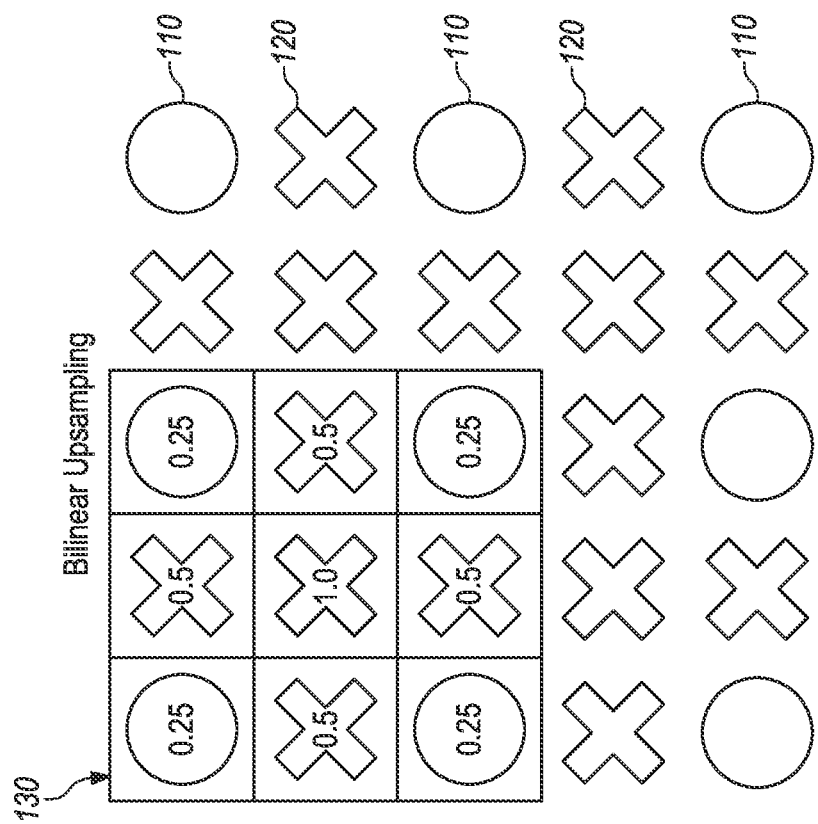
FIG. 1 illustrates bilinear upsampling using a convolution kernel.

FIG. 1 illustrates bilinear upsampling using a convolution kernel. FIG. 1 demonstrates an instance of 2× super-resolution, wherein an upsampled image is created with 4× the number of pixels as the original image. Bilinear upsampling can comprise resampling and interpolation. The lower-resolution image can be rescaled to a desired size (in this case, doubling the length and width). The pixel samples 110 of the lower-resolution image (represented as circles) can be arranged in a matrix with unknown samples 120 (represented as exes) assigned a zero value and interspersed between the samples 110. Once the matrix with samples 110 and unknown samples 120 has been generated, then each unknown sample 120 can be determined by bilinear interpolation. For example, each unknown sample 120 can be assigned a value by convolving a 3×3 portion of the matrix centered on that particular unknown sample 120 with a 3×3 convolution kernel 130 comprising the fixed values shown in FIG. 1. Thus, the convolution kernel 130 may be the matrix [[0.25, 0.5, 0.25], [0.5, 1, 0.5], [0.25, 0.5, 0.25]]. The values of convolution kernel 130 effectively assign weights to the neighboring samples 110 around the particular unknown sample 120. Thus, the unknown sample 120 can obtain pixel information (e.g., RGB values or luminance) which is a weighted average of the pixel information of the neighboring samples 110 according to the convolution kernel 130. In naïve bilinear upsampling, the same 3×3 convolution kernel may be used across an entire uniform grid of samples 110 and unknown samples 120, without accounting for the structure of the image—including the presence of edges. Because all of the pixel-wise operations needed to assign values to the unknown samples 120 can be processed in parallel, for example on a GPU, naïve bilinear upsampling can be computationally efficient. However, the resulting upsampled image may be blurry because the structure of the lower-resolution image is not accounted for in processing.

FIG. 2A illustrates a first improved upsampling technique using a convolution kernel and control parameters. Particular embodiments of the disclosed technology may comprise using the first improved upsampling technique to account for the structure of a lower-resolution image while performing upsampling. As shown in FIG. 2A, instead of uniformly using a single 3×3 convolution kernel to generate the pixel information for each unknown sample 120, a specialized convolution kernel 140 having four control parameters may be used. As explained further herein with more specificity, these control parameters (depicted as B, A, R, and G) can be inferred for each unknown sample 120 using a trained machine learning neural model using the lower-resolution image as input. For example, for a first unknown sample 120, the model may output that B=0.4, A=0.6, R=0.45, and G=0.55, leading to a convolution kernel of [[0.24, 0.55, 0.16], [0.45, 1, 0.55], [0.36, 0.45, 0.24]]. This first particularized convolution kernel could then be used to generate the pixel information for the first unknown sample 120. In further example, for a second unknown sample 120, the model may output that B=0.2, A=0.5, R=0.4, and G=0.6, leading to a convolution kernel of [[0.1, 0.6, 0.1], [0.4, 1, 0.6], [0.4, 0.4, 0.4]]. This second particularized convolution kernel could then be used to generate the pixel information for the second unknown sample 120. Importantly, although a convolution kernel is a convenient way to visualize the equations governing the upsampling when certain values are used for the various control parameters, the operations depicted in FIG. 2A could be executed under programmatic control without the use of a convolution kernel. All that is needed is to apply, for each pixel of the interpolated image, the proper weighted average of the neighboring pixel information indicated by the control parameters.

Figure 2B:
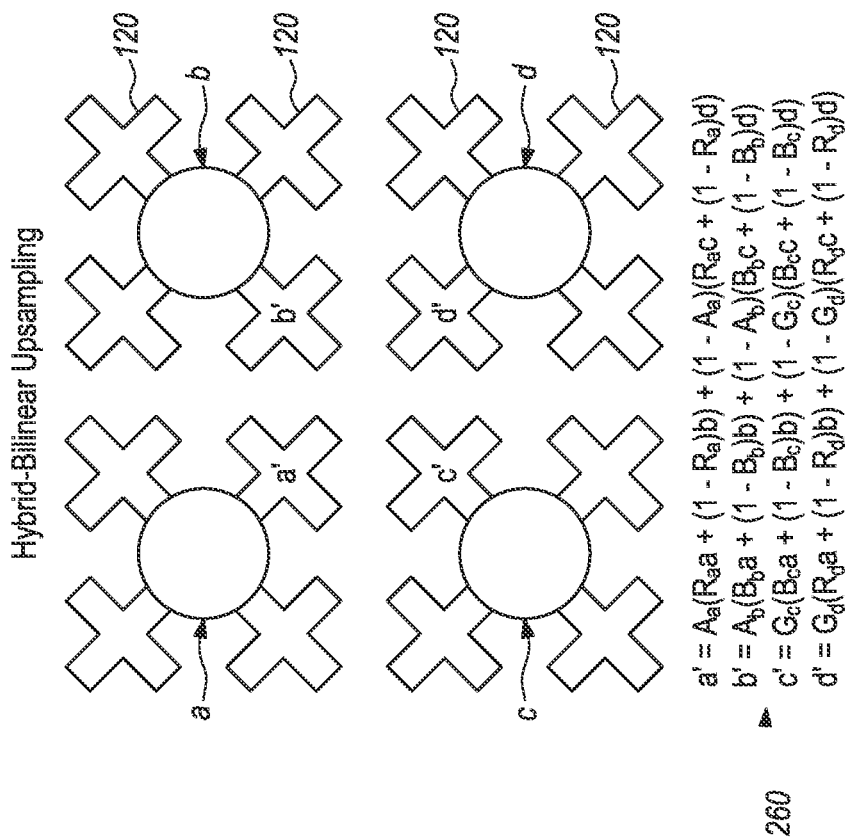
FIG. 2B illustrates a second improved upsampling technique using control parameters.

FIG. 2B illustrates a second improved upsampling technique using control parameters. Particular embodiments of the disclosed technology may comprise using the second improved upsampling technique to account for the structure of a lower-resolution image while performing upsampling. The depicted technique of FIG. 2B is similar to the depicted technique of FIG. 2A, except the interpolated image and the lower-resolution image are aligned center such that they share no overlapping pixels. This means that every single pixel of the interpolated image will need to be calculated using the control parameters, whereas in the technique of FIG. 2A every one in four pixels of the interpolated image is a duplicate of a pixel in the lower-resolution image. As depicted in FIG. 2B, each particular unknown sample 120 takes its value from a weighted average of the four samples 110 that bound that particular unknown sample 120. Specifically, Rx, Gx, Bx, Ax represent the control parameters associated with the pixel of the high-resolution image that is bounded by a, b, c, and d and which is nearest to the pixel x.

FIG. 2B illustrates that a convolution kernel need not be employed when using ML-generated control parameters to perform interpolation. Instead, the interpolated pixel information of the unknown samples a', b', c', and d' bounded by the samples a, b, c, and d, is given by the following set of equations, wherein $R_x$, $G_x$, $B_x$, and $A_x$ represent the control parameters associated with the pixel of the high-resolution image that is bounded by a, b, c, and d and which is nearest to the pixel x:

$$a'=A_a(R_a a+(1-R_a)b)+(1-A_a)(R_a c+(1-R_a)d)$$

$$b'=A_b(B_b a+(1-B_b)b)+(1-A_b)(B_b c+(1-B_b)d)$$

$$c'=G_c(B_c a+(1-B_c)b)+(1-G_c)(B_c c+(1-B_c)d)$$

$$d'=G_d(R_d a+(1-R_d)b)+(1-G_d)(R_d c+(1-R_d)d)$$

The novel techniques depicted in FIG. 2A and FIG. 2B represent a significant advance in the state of the art because tailoring the interpolation weights to the individual pixels can account for the structure of the low-resolution image, including the presence of edges, thereby offering superior performance compared to naïve bilinear upsampling. Moreover, the control parameters can be efficiently computed using a trained machine learning neural model executing on a dedicated neural accelerator, which is much better tailored to performing such calculation than a GPU. In various embodiments, technique of FIG. 2B may be particularly effective because the information of each pixel of the higher-resolution interpolated image is associated with a full complement of the four control parameters. Notably, although the aforementioned examples deal with 2× supersampling, the novel techniques of this disclosure are also extendable to 3× super-sampling or another degree of supersampling.

Split Machine Learning Assisted AR/VR Rendering

Figure 3:
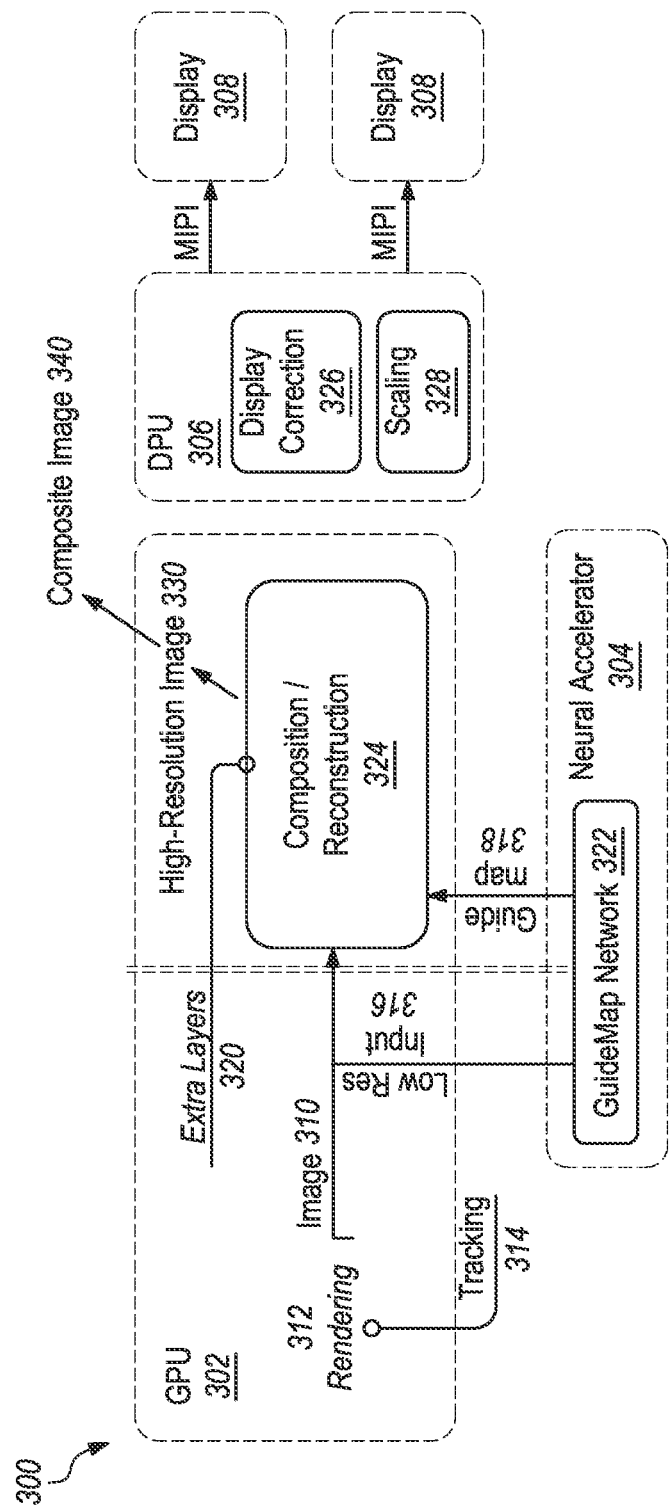
FIG. 3 depicts an example structural/functional diagram of one embodiment.

FIG. 3 depicts an example structural/functional diagram of one embodiment.

FIG. 3 depicts an example mobile VR/AR rendering pipeline 300. The pipeline 300 may be used to process images or video frames for display to a user of an AR or VR system.

The architecture depicted in FIG. 3 includes a graphics processing unit (GPU) 302, a neural accelerator 304, a display processing unit (DPU) 306, and two displays 308, however the depiction of FIG. 3 is not limiting: In practice, additional or different components might be included such as a central processing unit (CPU), a digital signal processor (DSP), or other components. The images or video frames generated by pipeline 300 may be presented to the user on one or more of the displays 308, for example on a head mounted display (HMD).

In pipeline 300, the GPU 302, can render 312 a low-resolution image 310 associated with a scene. The scene can comprise any desired output image, including, as an example, a composite image having multiple layers, which is intended for display to a user of the electronic device, using the one or more displays 308. The low-resolution image 310 may need to be displayed at a higher resolution to meet specific visual requirements, necessitating super-resolution. For example only, if the low-resolution image 310 is (M)×(N) pixels, then a high-resolution image 330 can be generated which is (2M)×(2N) pixels.

To render the low-resolution image 310, the GPU 302 can be programmed to process tracking data 314. The tracking data 314 may comprise head tracking data and/or eye tracking data. The tracking data 314 can be obtained from one or more sensors of the VR or AR system in use by the user. For example, the tracking data 314 can be used to predict one or more future head poses and/or points of view (PoV) using tracked information related to the user's changing head position or line of sight (LoS) over time. The low-resolution image 310 can be rendered to accurately portray one or more elements of a scene at a future time based on what the user should be able to see at the future time based on the user's predicted head pose and/or sight lines.

In one embodiment, a version of the low-resolution image 316 can be transmitted by the GPU 302 to the neural accelerator 304. In one embodiment, the low-resolution image 310 may comprise a color image. In one embodiment, the low-resolution image 310 can be processed on the GPU 302 to generate a monochrome (one-channel) version 316 of the low-resolution image 310. For example, a truecolor RGB image stored in HSL format or HSV format can be converted to greyscale by eliminating hue and saturation information associated with the pixels of the RGB image, while retaining luminance information. In one embodiment, the RGB image can be stored in an M×N×3 matrix. In one embodiment, the RGB image can be converted to HSL or HSB format and then a greyscale image can be stored in an M×N matrix. The M×N matrix may reflect only the luminance information, but not the hue or saturation information. Thus, in particular embodiments, the original version of the low-resolution image 310 may be transmitted to the neural accelerator 304, while in other embodiments a monochrome or other version 316 of the low-resolution image may be transmitted to the neural accelerator 304.

In one embodiment, the neural accelerator 304 can be programmed to process the transmitted version 316 of the low-resolution image 310 using a trained machine learning neural model 322, thereby outputting a plurality of control parameters or guide map 318.

In one embodiment, the guide map 318 comprises parameters which may be plugged into the weight functions for each pixel of the desired high-resolution image 330 to generate pixel weights that indicate how to perform an interpolation (e.g., as shown and described in reference to FIG. 2A and FIG. 2B). In one embodiment, the pixel weights indicate which pixels of the low-resolution image 310 should be referenced to assign values to a particular pixel of the high-resolution image 330.

In one embodiment, the pixel weights collectively indicate a respective orientation of one or more edges detected by the trained machine learning neural model 322 in the version of the low-resolution image 316. Thus, in one embodiment, using the monochrome version 316 of the low-resolution image to generate control parameters may be substantially as effective as using the original color version 310 of the low-resolution image to generate control parameters. And much less information needs to be transferred from the GPU 302 to the neural accelerator 304 when sending the monochrome version 316, thereby saving on power budget and processing resources, and reducing latency.

In one embodiment, a guide map 318 can be used to generate sets of 3×3 or 5×5 convolution kernels. For example, a guide map 318 can be used to generate a convolution kernel corresponding to each specific pixel of the high-resolution image 330. Thus, each pixel of the high-resolution image 330 can be assigned values using the pixels of the low-resolution image 310 and the corresponding convolution kernel (according to the weights indicated by that kernel). FIG. 1, FIG. 2A, and FIG. 2B, and their accompanying descriptions, further explain how a convolution kernel can be used to generate pixel information.

Returning to FIG. 3, the GuideMap Network 322 may be programmed as a convolutional neural network (CNN). In particular embodiments, the GuideMap Network 322 can be trained by first receiving a low-resolution training image. Next, the GuideMap Network 322 may output a guide map 318. Then, the guide map 318 and the low-resolution training image can be used to upsample a high-resolution output image. The high-resolution output image may then be compared to a ground truth high-resolution image corresponding to the low-resolution training image. The loss or difference between the upsampled high-resolution output image and the ground truth high-resolution image can be backpropagated to update the model parameters of the GuideMap network 322 so that the GuideMap network 322 may be able to output a more effective guide map 318 or control parameters in the future. Although this disclosure describes a particular method of training the GuideMap network 322 to generate effective control parameters 318 in a particular manner, this disclosure contemplates training the GuideMap network 322 to generate effective control parameters 318 in any suitable manner.

In particular embodiments, once the GPU 302 has received the guide map 318, it can output the high-resolution image. In particular embodiments, the GPU 302 may also proceed with composition/reconstruction 324 according to its programming. Reconstruction can occur first, before composition. The GPU 302 can be programmed to process the low-resolution image 310 and the guide map 318 to construct the high-resolution image 330. For example, the high-resolution image 330 can be constructed by assigning, based on the weights indicated by the guide map 318, one or more values to each pixel of the plurality of pixels of the high-resolution image 330. Once the high-resolution image 330 has been constructed, it can be composited with extra layers 320. Thus, in one embodiment, the GPU 302 can be programmed to process the high-resolution image 330 and additional data 320 associated with the scene, thereby outputting a composite image 340.

In one embodiment, the GPU 302 can transmit the composite image 340 to a display processing unit (DPU) 306 for display correction 326 and scaling 328. The composite image 340 may represent the ideal image intended to be shown to the user. However, in both AR and VR contexts, the display is not a flat 2D monitor or screen. The GPU-rendered image may be shown through a waveguide and may be seen through a set of complex lenses that introduces distortion. The DPU can be programmed to perform various compensations, such as barrel distortion, to account for the particularities of the display. Thus, in one embodiment, for the user to see the composite image, the DPU can then cause a compensated version of the composite image 340 to be displayed on one or more device displays 308. In one embodiment, final pixel generation and reconstructions can be merged with post-processing steps, e.g. composition or asynchronous time warp, to avoid extra resource cost or latency in the pipeline.

Notably, besides super-resolution, the split pipeline of the disclosure can also be applied to perform other operations such as frame prediction and extrapolation. For example, in one embodiment, machine learning processors can be programmed to generate low resolution motion vectors, while a GPU performs final reprojection and correction.

Figure 4:
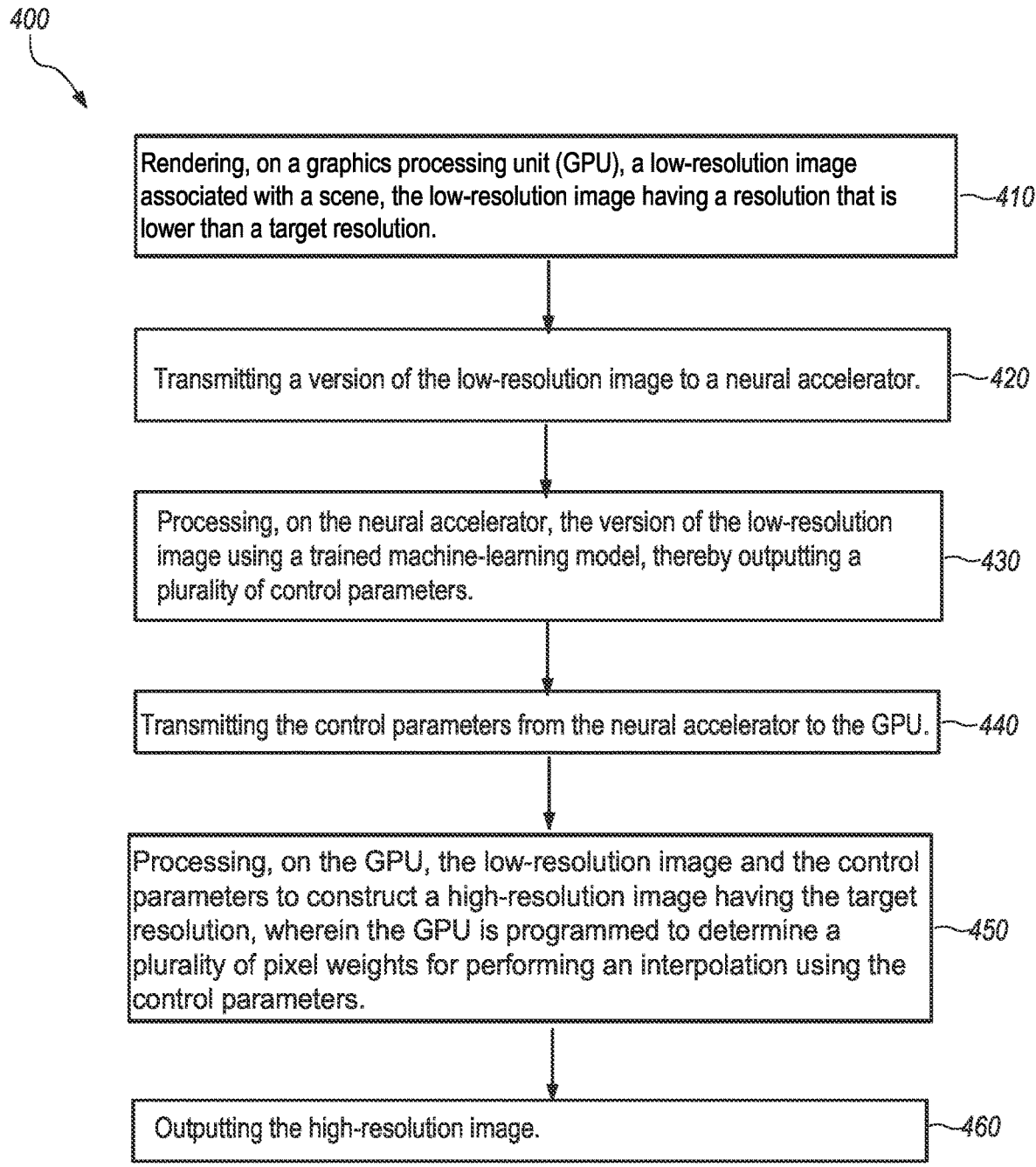
FIG. 4 illustrates an example method for processing images for display using a graphics processing unit (GPU) and a neural accelerator.

FIG. 4 illustrates an example method 400 for processing images for display using a graphics processing unit (GPU) and a neural accelerator. The method may begin at step 410, with rendering, on a graphics processing unit (GPU), a low-resolution image associated with a scene, the low-resolution image having a resolution that is lower than a target resolution. At step 420, method 400 is programmed to execute transmitting a version of the low-resolution image to a neural accelerator. At step 430, method 400 is programmed to execute processing, on the neural accelerator, the version of the low-resolution image using a trained machine-learning model, thereby outputting a plurality of control parameters. At step 440, method 400 is programmed to execute transmitting the control parameters from the neural accelerator to the GPU. At step 450, method 400 is programmed to execute processing, on the GPU, the low-resolution image and the control parameters to construct a high-resolution image having the target resolution, wherein the GPU is programmed to determine a plurality of pixel weights for performing an interpolation using the control parameters. At step 460, method 400 is programmed to execute outputting the high-resolution image. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for processing images for display using a graphics processing unit (GPU) and a neural accelerator including the particular steps of the method of FIG. 4, this disclosure contemplates any suitable method for processing images for display using a graphics processing unit (GPU) and a neural accelerator including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Artificial Neural Networks

Figure 5:
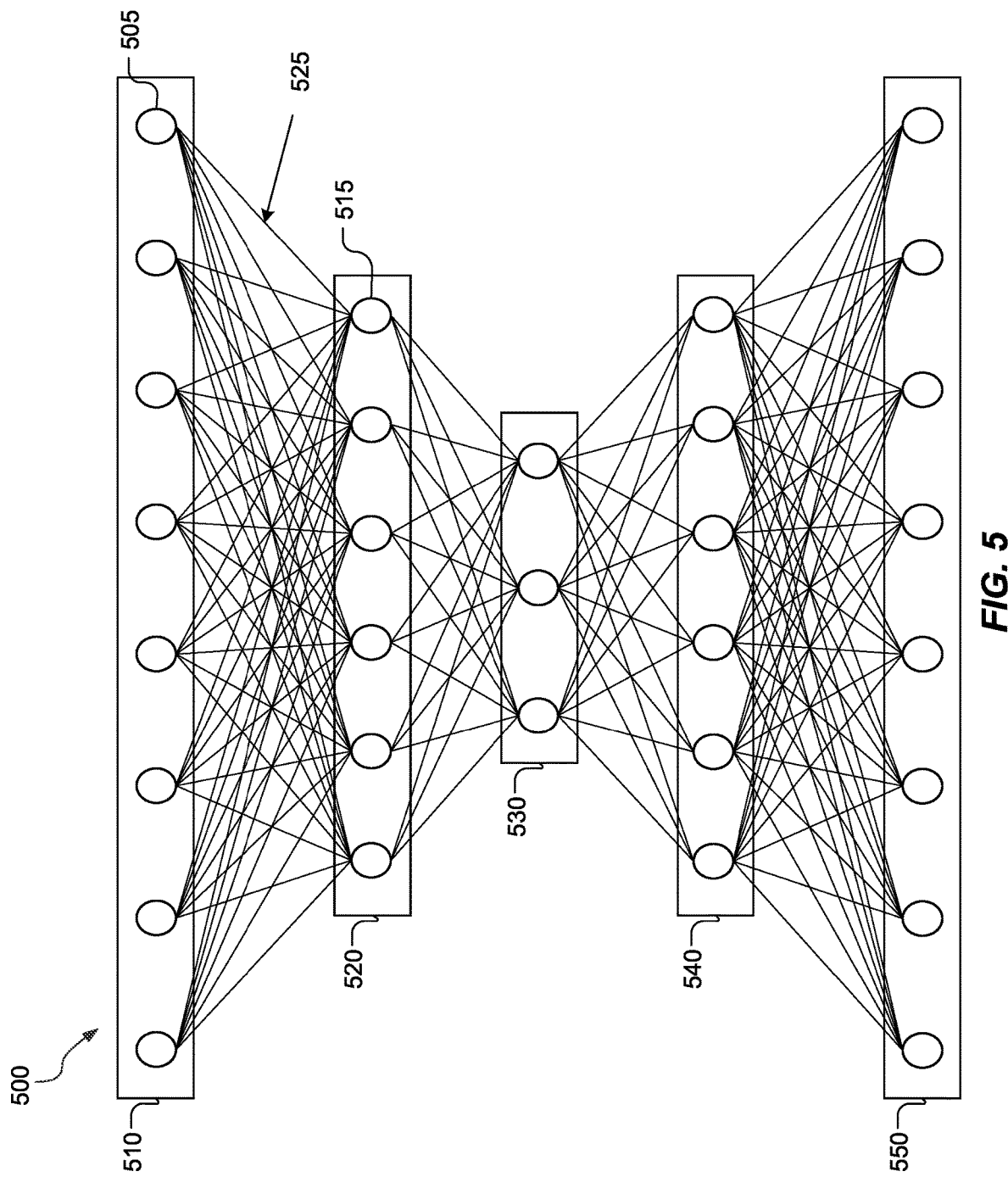
FIG. 5 illustrates an example artificial neural network ("ANN").

FIG. 5 illustrates an example artificial neural network ("ANN") 500. In particular embodiments, an ANN may refer to a computational model comprising one or more nodes. Example ANN 500 may comprise an input layer 510, hidden layers 520, 530, 540, and an output layer 550. Each layer of the ANN 500 may comprise one or more nodes, such as a node 505 or a node 515. In particular embodiments, each node of an ANN may be connected to another node of the ANN. As an example, and not by way of limitation, each node of the input layer 510 may be connected to one of more nodes of the hidden layer 520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example, and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 540. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example, and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 525 between the node 505 and the node 515 may have a weighting coefficient of 0.4, which may indicate that 0.4 multiplied by the output of the node 505 is used as an input to the node 515. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example, and not by way of limitation, training data may comprise inputs to the ANN 500 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example, and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Systems and Methods

Figure 6:
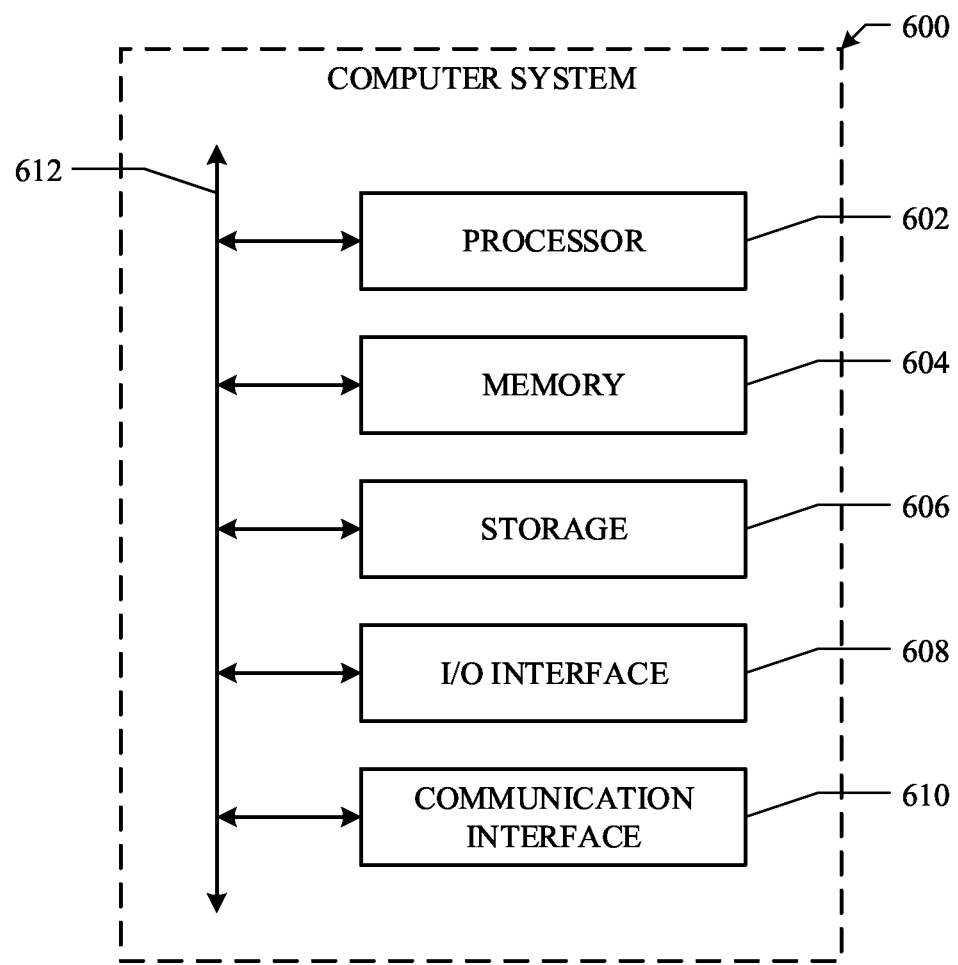
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   rendering, on a graphics processing unit (GPU), a low-resolution image associated with a scene, the low-resolution image having a resolution that is lower than a target resolution;
   transmitting a version of the low-resolution image to a neural accelerator;
   processing, on the neural accelerator, the version of the low-resolution image using a trained machine-learning model, thereby outputting a plurality of control parameters;
   transmitting the control parameters from the neural accelerator to the GPU;
   processing, on the GPU, the low-resolution image and the control parameters to construct a high-resolution image having the target resolution, wherein the GPU is programmed to determine a plurality of pixel weights for performing an interpolation using the control parameters; and
   outputting the high-resolution image.

2. The method of claim 1, wherein:
   each of the low-resolution image and the high-resolution image comprise a plurality of pixels, respectively; and
   the control parameters are used for determining, for each pixel of the high-resolution image, the one or more pixel weights respectively associated with one or more specific pixels of the low-resolution image that are used for computing a value for that pixel of the high-resolution image.

3. The method of claim 1, wherein the pixel weights collectively indicate a respective orientation of one or more edges detected by the trained machine learning neural model in the version of the low-resolution image.

4. The method of claim 1, wherein each of the low-resolution image and the high-resolution image comprise a color image, respectively, the method further comprising:
   processing, on the GPU, the low-resolution image to generate the version of the low-resolution image;
   wherein the version of the low-resolution image comprises a monochrome (one-channel) image.

5. The method of claim 1, further comprising:
   processing, on the GPU, the high-resolution image and additional data associated with the scene, thereby outputting a composite image; and
   displaying the composite image on a device display.

6. The method of claim 5, further comprising:
   transmitting the composite image to a display processing unit (DPU); and
   executing, on the DPU, display correction and scaling of the composite image before displaying the composite image on the device display.

7. The method of claim 1, wherein the trained machine-learning model is programmed as a convolutional neural network (CNN).

8. A system comprising: one or more processors; and a non-transitory memory coupled to the processors comprising instructions executable by the processors, the processors operable when executing the instructions to perform a method, the method comprising:
   rendering, on a graphics processing unit (GPU), a low-resolution image associated with a scene, the low-resolution image having a resolution that is lower than a target resolution;
   transmitting a version of the low-resolution image to a neural accelerator;
   processing, on the neural accelerator, the version of the low-resolution image using a trained machine-learning model, thereby outputting a plurality of control parameters;
   transmitting the control parameters from the neural accelerator to the GPU;
   processing, on the GPU, the low-resolution image and the control parameters to construct a high-resolution image having the target resolution, wherein the GPU is programmed to determine a plurality of pixel weights for performing an interpolation using the control parameters; and
   outputting the high-resolution image.

9. The system of claim 8, wherein:
   each of the low-resolution image and the high-resolution image comprise a plurality of pixels, respectively; and
   the control parameters are used for determining, for each pixel of the high-resolution image, the one or more pixel weights respectively associated with one or more specific pixels of the low-resolution image that are used for computing a value for that pixel of the high-resolution image.

10. The system of claim 8, wherein the pixel weights collectively indicate a respective orientation of one or more edges detected by the trained machine learning neural model in the version of the low-resolution image.

11. The system of claim 8, wherein each of the low-resolution image and the high-resolution image comprise a color image, respectively, and wherein the processors are further operable when executing the instructions to perform:
- processing, on the GPU, the low-resolution image to generate the version of the low-resolution image;
- wherein the version of the low-resolution image comprises a monochrome (one-channel) image.

12. The system of claim 8, wherein the processors are further operable when executing the instructions to perform:
- processing, on the GPU, the high-resolution image and additional data associated with the scene, thereby outputting a composite image; and
- displaying the composite image on a device display.

13. The system of claim 12, wherein the processors are further operable when executing the instructions to perform:
- transmitting the composite image to a display processing unit (DPU); and
- executing, on the DPU, display correction and scaling of the composite image before displaying the composite image on the device display.

14. The system of claim 8, wherein the trained machine-learning model is programmed as a convolutional neural network (CNN).

15. One or more computer-readable non-transitory storage media embodying software that is operable when executed to perform a method, the method comprising:
- rendering, on a graphics processing unit (GPU), a low-resolution image associated with a scene, the low-resolution image having a resolution that is lower than a target resolution;
- transmitting a version of the low-resolution image to a neural accelerator;
- processing, on the neural accelerator, the version of the low-resolution image using a trained machine-learning model, thereby outputting a plurality of control parameters;
- transmitting the control parameters from the neural accelerator to the GPU;
- processing, on the GPU, the low-resolution image and the control parameters to construct a high-resolution image having the target resolution, wherein the GPU is programmed to determine a plurality of pixel weights for performing an interpolation using the control parameters; and
- outputting the high-resolution image.

16. The storage media of claim 15, wherein:
- each of the low-resolution image and the high-resolution image comprise a plurality of pixels, respectively; and
- the control parameters are used for determining, for each pixel of the high-resolution image, the one or more pixel weights respectively associated with one or more specific pixels of the low-resolution image that are used for computing a value for that pixel of the high-resolution image.

17. The storage media of claim 15, wherein the pixel weights collectively indicate a respective orientation of one or more edges detected by the trained machine learning neural model in the version of the low-resolution image.

18. The storage media of claim 15, wherein each of the low-resolution image and the high-resolution image comprise a color image, respectively, and wherein the software is further operable when executed to perform:
- processing, on the GPU, the low-resolution image to generate the version of the low-resolution image;
- wherein the version of the low-resolution image comprises a monochrome (one-channel) image.

19. The storage media of claim 15, wherein the software is further operable when executed to perform:
- processing, on the GPU, the high-resolution image and additional data associated with the scene, thereby outputting a composite image; and
- displaying the composite image on a device display.

20. The storage media of claim 19, wherein the software is further operable when executed to perform:
- transmitting the composite image to a display processing unit (DPU); and
- executing, on the DPU, display correction and scaling of the composite image before displaying the composite image on the device display.

* * * * *